3,736,240
POST-CHLORINATED VINYL CHLORIDE RESIN AND PROCESS THEREFOR USING RADIATION
Lester Weintraub, Livingston, N.J., assignor to Air Products and Chemicals, Inc., Allentown, Pa.
No Drawing. Filed Dec. 28, 1970, Ser. No. 102,041
Int. Cl. B01j *1/10, 1/12*
U.S. Cl. 204—159.18                                    11 Claims

ABSTRACT OF THE DISCLOSURE

Post-chlorinated polyvinyl chloride resin having high thermal stability, heat deflection temperature and impact strength, together with an adequate melt flow rate, is prepared by chlorinating vinyl chloride homopolymer or vinyl chloride-ethylene or propylene interpolymer, while irradiated with ultraviolet light in a chloroform solution, to a chlorine content of at least about 65 weight percent.

---

This invention is concerned with a post-chlorinated vinyl chloride resin suitable for hot molding, extrusion, thermo-forming, and other hot shaping operations to produce shaped objects having desirable physical properties, including high heat deflection temperatures.

Vinyl chloride homopolymers are, in general, rigid materials characterized by substantial resistance to chemical attack, and they are used extensively in the chemical processing industry as well as in other manufacturing applications. Thus, unplasticized rigid polyvinyl chloride resins have a desirable combination of properties, viz:

(1) Excellent resistance to water, acids, alkalies, salts, organic chemicals, and to external aging environments.
(2) Low vapor permeability to water, oxygen and many volatile organic compounds.
(3) High clarity and gloss.
(4) High modulus and physical strength.
(5) Non-flammability.
(6) Good electrical properties.

Polyvinyl chloride has been proposed for the making of structural parts such as roofing members and siding, wall sections, pipes and other fluid- and solid-conducting elements, and the like, and vinyl chloride homopolymers are generally suitable for such purposes if the shaped object formed from the polymer is not to be subjected to elevated temperatures in service since polyvinyl chloride has relatively low thermal stability and heat-deflection temperature (HDT), sometimes referred to as heat "distortion" temperature, as measured by standard testing procedures, particularly Test Method D–648 of the American Society for Testing and Materials (ASTM). It has been proposed to raise the HDT of polyvinyl chloride to an acceptable level for most purposes by "post-chlorinating" the polymer to increase its normal chlorine content. While post-chlorination is effective to increase the HDT of the polyvinyl chloride, the introduction of the chlorine also results in derogation of two other desired properties of the polymer, namely, melt flow rate and impact strength. Melt flow rate as measured by standard test procedures, such as ASTM D1238–57T, condition F, is greatly reduced by chlorination and by the time sufficient chlorine has been introduced into the polymer to give the post-chlorinated polyvinyl chloride an adequately high HDT, its melt flow rate has become substantially zero so that it is resistant to molding and shaping by conventional molding techniques. The impact strength, as measured by Procedure A of ASTM Method D 256, of polyvinyl chloride is also substantially reduced by chlorination, usually to a value no higher than about 0.5 ft. lb./in. of notch.

It has now been found that homopolymers of vinyl chloride and interpolymers of vinyl chloride and ethylene or propylene, if chlorinated while dissolved in chloroform and while irradiated with light, e.g., ultraviolet light, about 3000 to 4000 angstroms can, if the chlorination is sufficient to raise the interpolymer's chlorine content to at least about 65, or 67 weight percent, be greatly improved in heat deflection temperature and have adequate properties of melt flow rate at the temperatures at which the resin can be processed and adequate impact strength, for example, a notched Izod impact strength of at least about 0.65 ft. lb./in. and often over 2 ft. lb./in. Also the vinyl chloride resins, including the homopolymers, of this invention have adequate processability as shown by the standard Brabender torque rheometer. At 400° F., and higher, the post-chlorinated vinyl chloride-propylene copolymers also showed longer stability times without degradation at equal torque as compared to the post-chlorinated vinyl chloride homopolymer. In addition to high heat deflection temperature, i.e. at least 115° C., preferably at least 125° C., or higher, the resin of the present invention, particularly when using the interpolymers, exhibits a substantially improved thermal stability over that of the starting material, and generally the extent of improvement in heat stability is significantly greater than that obtained by other chlorination methods, or by a lesser degree of chlorination. Usually, for example, the resin of this invention will have a heat stability of at least about 90 minutes at 400° F., and preferably at least about 120 minutes and often about 180 minutes at that temperature.

The polymers suitable for use as the starting material to make the post-chlorinated resin of the present invention have an intrinsic viscosity of about 0.5 to 1.5 dl./g., generally 0.5 to 1.2 dl./g., preferably about 0.6 to 0.9 dl./g. The interpolymers typically contain about 85 to 98 parts by weight of polymerized vinyl chloride, about 2 to 15 parts by weight of polymerized ethylene or propylene, and optionally can contain 0 to about 10 percent by weight (of the vinyl chloride and ethylene or propylene combined) of polymerized, dissimilar, interpolymerizable, mono-unsaturated, vinyl group- or vinylidene group-containing monomer. By "dissimilar" monomer is meant a monomer other than vinyl chloride and propylene. Examples of suitable dissimilar monomers are substituted ethylenes such as tetrafluoroethylene, chlorotrifluoroethylene, vinyl fluoride and vinylidene chloride.

While various vinyl chloride-propylene copolymers having the combination of properties described above can be used in preparing the post-chlorinated vinyl chloride resin of this invention, particularly suitable and effective are the copolymers disclosed in U.S. Pat. 3,468,858, issued to C. A. Heiberger and L. Fishbein, Sept. 23, 1969. The disclosure of such patent is incorporated herein. Such vinyl chloride-propylene copolymers are linear in structure, have minimum branching, have the propylene units randomly distributed among the vinyl chloride units in the polymer chain, and are characterized by the presence of propylene-derived endcaps. The copolymers of the Heiberger patent contain at least 1% by weight propylene and can have up to 10% by weight, or more, propylene with a particularly useful range being from about 2% to about 8% by weight. The intrinsic viscosity of such copolymers is about 0.5 to about 1.5 dl./g., and they have a melt flow rate of at least 0.1 dg./min. with an apparent modulus of elasticity of at least 100,000 p.s.i. at a maximum temperature in the range of about 65° C. to about 80° C. As disclosed in the above-mentioned patent these vinyl chloride-propylene copolymers are suitably produced by polymerization of vinyl chloride and propylene at temperatures of 5 to 75° C., usually 30 to 60° C., at pressures that are usually no higher than about 250 lb. per square inch, generally 100 to 200 lb. per square inch. The most convenient process for preparing the vinyl chloride-propylene copolymers is essentially of the suspension polymerization type described in the Heiberger patent and the monomers are copolymerized in an aqueous system, under constant agitation, in the presence of appropriate suspending and surface active agents, with the pH being advantageously maintained at a value of 5 to 8.5. However, other processes known to the art, such as emulsion, solution, and mass polymerization can be employed to prepare these copolymers.

Chlorination of the polymer to yield the resin of the present invention is effected by dissolving the polymer in chloroform to produce a 5 to 10 weight percent solution of the polymer and then passing chlorine into the solution while irradiating it with activating amounts of ultraviolet light and maintaining it, under atmospheric conditions, at from about room temperature, e.g. about 23° C. to reflux temperature (about 60° C.) or even higher under pressure, preferably about 35 to 50° C. The chlorination is continued in this manner for a time sufficient to elevate the chlorine content of the resin to at least about 65 weight percent, preferably about 67 to 73 weight percent. The percent chlorine content at which the improved properties of this invention, i.e. improved thermal stability, impact strength and heat deflection temperature are achieved will vary for the particular resin. For the homopolymer and preferred interpolymer of vinyl chloride and propylene, or ethylene, the desired chlorine content is 67 weight percent whereas for a terpolymer of vinyl chloride, propylene and tetrafluoroethylene the desired chlorine content is 65 weight percent. It generally takes about 3 to 4 hours to introduce 67 to 70 weight percent chlorine.

Chlorine content, as used herein, is as measured by the well-known Parr bomb combustion method (Peroxide Bomb Apparatus and Method, Manual No. 121, Parr Instrument Co., Moline, Ill., 1950). Intrinsic viscosity values in dl./g., as used herein, are determined in conventional manner by extrapolation to infinite dilution of the reduced viscosity values at several concentrations of the polymer in cyclohexanone, as determined, for example, according to ASTM, D1243–60, Method A, but at 25° C. Weight percent propylene in the polymer is determined from chlorine analysis and correlated with volume percent propylene as determined by measurements of specific gravity (ASTM D792–60T) on a standard molded composition containing 3 parts by weight of an organic tin mercaptide stabilizer ("Advastab T–360") per 100 parts by weight of copolymer. Melt flow rate of the vinyl chloride interpolymer from which the post-chlorinated resin of this invention is made is determined by means of ASTM D1238–57T, condition F, for the interpolymer in the above standard molded composition. Heat, or oven, stability, as used herein, is determined by ASTM Method D2115–67.

The utility of the post-chlorinated vinyl chloride resin lies in its application in the formation of shaped articles by conventional forming operations under the application of heat, particularly shaped articles which are to be exposed in series to elevated temperatures, e.g. temperatures of 185° to 250° F., and even higher, e.g., up to about 300° F. When used to make such articles, the resins are suitably compounded in conventional manner, i.e. they may have added to them stabilizers and lubricants, and they may also be compounded with fillers, pigments, and resin additives to modify properties as desired. Conventional compounding agents of a type well known in the polymer art, and particularly in connection with vinyl resins, are suitably used. For example, suitable stabilizers include the well-known alkyl tin thioglycollate (e.g. "Thermolite 31"), di-octyl tin dilaurate, basic lead carbonate, metal phenates such as zinc, lead or tin phenate and barium n-nonyl phenate, fatty acid soaps of lead, cadmium, barium, calcium, magnesium and zinc, cadmium benzoate, triphenyl phosphite, mono-octyl diphenyl phosphite, di(epoxy-ethyl)benzene, epoxidized fatty oils, manganous pyrophosphite, and the like, alone or in combination. The function of various stabilizers in vinyl polymers is well known and is described, for example, in "Polymer Processes" by Schildknecht, pages 542–548. In general, any of the many stabilizers suitable for use with polyvinyl chloride may be employed.

In like manner, conventional lubricants, such as mineral oil, fatty acids, synthetic waxes of the fatty amide and ester types, octyl stearate and calcium stearate, are used. Polymer lubricants are referred to in Schildknecht, pp. 685 et seq. The stabilizers or inhibitors and lubricants are used in varying quantities, such as described in the foregoing publication, depending upon the nature of the individual agent. For example, stabilizers are generally used in the amount of 0.5 to 5% by weight of the post-chlorinated copolymers but the overriding criterion is the use of a small amount sufficient to effect the desired stabilization. The same considerations apply in the use of lubricants. In general, lubricants are used in amounts ranging from 0.1 to 1% or more by weight of the copolymer. The post-chlorinated vinyl chloride-propylene copolymer is usually combined with 0.1 to 10% by weight of combined lubricant and stabilizer.

Any and all pigments commonly employed in coloring polyvinyl chloride compositions may be used, such as carbon black, titanium dioxide, phthalocyanines, and the like, depending upon the color, if any, desired in the final product.

Either fibrous or non-fibrous fillers may be employed in preparing resinous compositions comprising the post-chlorinated vinyl chloride resin. The fibrous fillers that may be used include asbestos, glass fibers, cotton, rayon, nylon and the mineral wools. Asbestos is the most commonly used fibrous filler. The useful non-fibrous inorganic fillers include the many materials that are commonly employed as fillers in the plastics industry. These include, for example, calcium carbonate, calcium sulfate, calcium silicate, barium carbonate, barium sulfate, silica, china clay, kaolin, fuller's earth, and magnesium silicate, as well as such pigments as titanium dioxide, lead chromate, and the like. The fibrous fillers can suitably be used in amounts up to approximately 200 parts and the non-fibrous fillers in amounts up to approximately 300 parts by weight per 100 parts by weight of post-chlorinated vinyl chloride resin.

While plasticizers are not ordinarily used in making rigid products, they can be used if desired. Any of the usual plasticizers for vinyl chloride resins may be used with the resin of the present invention. These include for example, dioctyl phthalate, dibutyl sebacate, tricresyl phosphate, and the like. The amount of plasticizers used can vary depending on the rigidity and hardness desired.

In addition to the ingredients described, other resin additives, such as extends, solvents, binders, and the like, may be present in the amounts ordinarily employed in the polyvinyl chloride art.

It is sometimes desirable to compound the post-chlorinated vinyl chloride resin with other resinous materials which have a modifying effect upon the former. Examples of resinous materials suitable for this purpose include polyvinyl chloride, vinyl chloride-vinyl acetate copolymer and other vinyl chloride copolymers, chlorinated polyolefins, chlorinated polyvinyl chloride and other chlorinated vinyl chloride copolymers, acrylonitrile-butadiene-styrene polymers, acrylonitrile-butadiene copolymers, alkyl acrylate-methacrylate copolymers, such as polymers containing ethyl acrylate and methyl methacrylate, ethylene-alkyl acrylate copolymers, ethylene-vinyl acetate copolymers, and chlorinated paraffin waxes. Such modifying resinous materials can be used in various amounts but ordinarily in relatively minor proportions, e.g. less than 50% by weight of the post-chlorinated vinyl chloride resin of this invention, preferably 5 to 25%.

While the invention has been described above in its broader terms, it will be more fully understood by reference to the following specific examples of practical application.

EXAMPLES I to XXVIII

The reactor employed was a 4-liter resin flask equipped with surrounding water bath, stirrer, thermometer, gas inlet tube and condenser. An ultra-violet light was placed adjacent the flask. The reaction mixture consisted of 2200 ml. of chloroform and 140 g. of polymer, e.g. vinyl chloride-propylene copolymer. The solution was purged with nitrogen. The ultra-violet light was then turned on and chlorine was introduced at a rate slightly in excess of the rate at which it was consumed. The temperature was maintained at about 36° C. by means of the water bath, and after a period of about 4 hr. the ultra-violet light and chlorine flow were turned off and the reaction mixture was purged with a nitrogen flow rate of about 50 liters per hour. This required about 90 minutes. The product was then filtered, washed three times with methanol, filtered, and air dried and finally vacuum dried at 45–50° C.

Properties of the polymer before and after chlorination were as described in Table I which also sets forth for comparison in Examples I to IV dry chlorination and suspension chlorination runs using the same or similar starting polymers.

Table II demonstrates the improved properties obtained when a vinyl chloride homopolymer and a vinyl chloride-propylene interpolymer are chlorinated to above about 67% by weight chlorine. Examples XXI and XXII demonstrate that a vinyl chloride-propylene-tetrafluoroethylene interpolymer should be chlorinated to above about 65% by weight chlorine.

TABLE I

| Example | I | II | III | IV | V | VI | VII | VIII | IX |
|---|---|---|---|---|---|---|---|---|---|
| Starting copolymer | VC-P | VC-P | VC-P | PVC | VC-P | VC-P | VC-P | VC-P | PVC |
| Cl content, wt. percent | 54.0 | 54.0 | 54.0 | 56.8 | 54.0 | 54.0 | 54.0 | 54.6 | 56.8 |
| Propylene content, wt. percent | 5 | 5 | 5 | 0 | 5 | 5 | 5 | 4 | 0 |
| Intrinsic viscosity, dl./g | .6 | .6 | .6 | 0.63 | .6 | .6 | .6 | .68 | .63 |
| Specific gravity | 1.372 | 1.372 | 1.372 | 1.401 | 1.372 | 1.372 | 1.372 | 1.380 | 1.401 |
| Condition of chlorination | A | A | B | B | C | C | C | C | C |
| Final product, Cl content | 68.5 | 68.6 | 68.5 | 70.1 | 68.2 | 68.5 | 67.8 | 67.5 | 67.5 |
| Product intrinsic viscosity, dl./g | 0.43 | 0.44 | | | 0.60 | 0.57 | | | .62 |
| Product, specific gravity | 1.587 | 1.586 | 1.585 | 1.599 | 1.584 | | 1.590 | 1.583 | 1.573 |
| Izod impact (ft. lb./in.) (average) | 0.31 | 0.33 | 0.29 | 0.30 | 2.2 | [1] 5.5 | ([2] [3]) | 4.5 | 3.9 |
| HDT (° C.) | 114 | 118 | 100 | 102 | 135 | | 141 | 132 | 125 |
| $T_f$ (° C.) | | | 101 | 107.2 | 132.5 | | | 130.1 | 123.0 |
| $T_4$ (° C.) | | | 130.8 | 133.0 | 154.0 | | | 153.6 | 143.8 |
| Thermal stability at 400° F., min | 90 | 65 | | | 120 | >150 | >120 | >150 | 150 |

[1] Partial break.
[2] 3.5, partial break.
[3] 1.2, complete break.

NOTE.—A. Dry Chlorination=2 liter/min. Cl², 3.5 liter/min. N₂, fluorescent (D) light, and 70° C.; B. Suspension Chlorination=1 liter/min. Cl₂, ultraviolet light, and 35° C.; C. Solution Chlorination (CHCl₃)=1 liter/min. Cl₂, ultraviolet light, and 35° C.

TABLE II.—SOLUTION CHLORINATION

| Example | Starting resin | Product, percent Cl. | Specific gravity | $T_f$ (° C.) | $T_4$ (° C.) | HDT (° C.) | Izod impact (ft. lb./in.) (average) | Oven stab., 400° F. min |
|---|---|---|---|---|---|---|---|---|
| X | Example VI | 68.5 | | | | | [1] 5.5 | 150 |
| XI | do | 68.2 | 1.584 | 132.5 | 154.0 | 135 | 2.2 | 120 |
| XII | do | 67.8 | 1.590 | | | 141 | [1] 3.5 / [2] 1.2 | 120 / 120 |
| XIII | do | 67.3 | | | | | [2] .85 / [1] 1.3 | 150 / — |
| XIV | do | 68.8 | | | | | 2.4 | 120 |
| XV | Example VIII | 69.2 | 1.594 | 133.5 | 156.0 | | 2.6 | 120 |
| XVI | do | 67.5 | 1.583 | 130.1 | 153.6 | 132 | 4.5 | 150 |
| XVII | do | 69.3 | 1.594 | 132.2 | 169.0 | 136 | 4.1 | 90 |
| XVIII | VC— (R1) | 68.9 | 1.590 | 130.0 | 158.8 | 127.5 | 1.0 | 140 |
| XIX | Example IX | 67.5 | 1.573 | 123.0 | 143.8 | 125 | 3.9 | 150 |
| XX | PVC homopolymer (R2) | 67.8 | 1.569 | 119.3 | 148.0 | 122 | [1] 4.0 / [3] 1.1 / [3] 2.06 | — / — / — |
| XXI | VC-P-TFE (R3) | 65.4 | 1.619 | 127.5 | 151.5 | 126 | 3.1 | 180 |
| XXII | VC-P-TFE (R3) | 64.5 | 1.599 | 115.5 | 138.5 | | 2.5 | 120 |
| XXIII | Example VI | 66.0 | 1.539 | 106.8 | 123.5 | 106 | .44 | 60 |
| XXIV | do | 66.4 | 1.548 | 120.5 | 132.5 | 114 | .41 | 120 |
| XXV | Example VIII | 65.7 | 1.5445 | 112.8 | 126.4 | 111 | .62 | 85 |
| XXVI | do | 66.6 | 1.548 | 117.1 | 128.2 | 109 | .4 | — |
| XXVII | VC-P (R1) | 66.7 | 1.547 | 119.0 | 132.1 | 111 | .54 | 120 |
| XXVIII | PVC (R2) | 66.0 | 1.532 | 109.5 | 125.4 | 104 | .7 | 110 |

[1] Partial break.
[2] Complete break.
[3] Hinge break.

NOTE.—(R1)=Vinyl chloride-propylene interpolymer, 3.3 wt. percent propylene, 54.8 wt. percent chlorine, intrinsic viscosity, 0.75 dl./g., specific gravity, 1.38; (R2)=specific gravity 1.403, intrinsic viscosity 0.9 dl./g.; (R3)=Vinyl chloride-propylene-tetrafluoroethylene interpolymer, wt. percent F, 6.3, wt. percent Cl. 50.5, wt. percent TFE, 8.2, wt. percent propylene, 3.0, intrinsic viscosity, 0.69 dl./g., specific gravity 1.4113.

Brabender values were obtained for the VC–P propylene copolymer of Example VII, Table I, and homopolymer of Example IX, Table I, using the formulation:

| | Parts by weight |
|---|---|
| Resin | 100 |
| Ca-Zn heat stabilizer (Mark 33) | 3 |
| Calcium stearate | 5 |
| Pentaerythritol | 1 |
| Antioxidant (Topanol CA) | 1 |
| Tris(nonyl-phenyl)phosphite | 1 |
| Epoxidized linseed oil | 2 |
| Acrylic resin (K–120N) | 2 |
| Post-chlorinated polyethylene (QX2243.16) | 5 |
| Ppt. chalk | 5 |
| $TiO_2$ | 5 |

The Brabender values for the copolymer were:

410° F.: 20 minutes at 1900 m-g torque
440° F.: 13 minutes at 1250 m-g torque

Extrapolation to 1500 m-g torque gives a time of 16 min.

Brabender values for the homopolymer were:

400° F.: 20 minutes at 2200 m-g torque
425° F.: 13 minutes at 1900 m-g torque

Extrapolation to 1500 m-g torque gives a time of 6.5 min.

EXAMPLE XXIX

Chlorination of the resin of Example VII, Table I, following the same procedure of that example, substituting incandescent light for the ultraviolet produces a product as follows:

| | |
|---|---|
| Wt. percent chlorine | 70.4 |
| Intrinsic viscosity dl./g. | 0.57 |
| $T_f$ (° C.) | 142.0 |
| $T_4$ (° C.) | 163.0 |
| Sp. gr. | 1.605 |
| Izod impact (ft. lb./in.) (av.) | 1.62 |

I claim:

1. A post-chlorinated resin having a heat deflection temperature of at least 115° C., a heat stability of at least about 90 minutes at 400° F. and a notched Izod impact strength of at least about 0.65 ft.lb./in., said resin prepared by subjecting to chlorination a vinyl chloride-propylene copolymer containing from 1 to about 10% by weight propylene, said copolymer having an intrinsic viscosity of about 0.5 to about 1.5 dl./g., a melt flow rate of at least 0.1 dg./min. with an apparent modulus of elasticity of at least 100,000 p.s.i. at a maximum temperature in the range of about 65° C. to about 80° C., said chlorination being effected by dissolving the copolymer in chloroform to produce a 5 to 10 weight percent solution of the copolymer and passing chlorine into the solution while subjected to light irradiation, the chlorine being introduced in amounts sufficient to provide the resin with a chlorine content of at least 67 to about 73 weight percent.

2. The resin of claim 1 wherein the polymer is subjected to ultraviolet light during chlorination.

3. The resin of claim 1 wherein the chlorination is carried out at a temperature of about room temperature to 60° C.

4. The resin of claim 1 having a heat stability of at least 120 minutes at 400° F.

5. The resin of claim 2 wherein the ultraviolet light has a wavelength varying from 300 to 4000 angstroms.

6. A process for preparing a post-chlorinated resin having a heat deflection temperature of at least 115° C., a heat stability of at least about 90 minutes at 400° F. and a notched Izod impact strength of at least about 0.65 ft. lb./in., said resin prepared by subjecting to chlorination a vinyl chloride-propylene copolymer containing from 1 to about 10% by weight propylene, said copolymer having an intrinsic viscosity of about 0.5 to about 1.5 dl./g., a melt flow rate of at least 0.1 dg./min. with an apparent modulus of elasticity of at least 100,000 p.s.i. at a maximum temperature in the range of about 65° C. to about 80° C., said chlorination being effected by dissolving the copolymer in chloroform to produce a 5 to 10 weight percent solution of the copolymer, and passing chlorine into the solution of the copolymer while subjected to light irradiation, the chlorine being introduced in amounts sufficient to provide the resin with a chlorine content of at least 67 to about 73 weight percent.

7. The process of claim 6 wherein the copolymer is subjected to ultraviolet light during chlorination.

8. The process of claim 7 wherein the ultraviolet light has a wavelength varying from 3,000 to 4,000 angstroms.

9. The process of claim 6 wherein chlorination is conducted at a temperature of about room temperature to 60° C.

10. The process of claim 6 wherein the chlorine is introduced in amounts sufficient to provide the resin with a chlorine content of at least 67 to about 70 weight percent.

11. The resin of claim 1 wherein the chlorine is introduced in amounts sufficient to provide the resin with a chlorine content of at least 67 to about 70 weight percent.

References Cited

UNITED STATES PATENTS

| | | | |
|---|---|---|---|
| 358,666 | 4/1943 | Hanschke | 260—92.8 |
| 3,532,612 | 10/1970 | Weben et al. | 204—159.18 |
| 3,334,077 | 8/1967 | Gateff | 260—92.84 C |
| 3,341,508 | 9/1967 | Elsner et al. | 260—92.84 C |
| 2,080,589 | 5/1937 | Wick | 260—92.84 C |
| 3,632,848 | 1/1972 | Young et al. | 260—92.84 C |
| 2,996,489 | 8/1961 | Dannis et al. | 260—92.84 C |

JOHN C. BLEUTGE, Primary Examiner

R. B. TURER, Assistant Examiner

U.S. Cl. X.R.

260—23 XA, 28.50, 41 A, 41 B, 41 R, 45.7 P, 45.75 K, 45.75 R, 87.5, 80.77, 92.84 C, 890, 891, 897 C, 899